United States Patent Office 2,838,399
Patented June 10, 1958

2,838,399

NON-GUSHING CARBONATED BEVERAGES AND PROCESS FOR PREPARING THE SAME

Edward H. Vogel, Jr., St. Louis, Mo., assignor to Organic Chemical Corporation, St. Louis, Mo., a corporation of Missouri No Drawing. Application October 5, 1955
Serial No. 538,806

19 Claims. (Cl. 99—48)

This invention relates to improvements in stable carbonated beverages, and in particular is concerned with means for preventing gushing in such beverages. The invention will be specifically described with respect to fermented malt beverages, as beer, but it will be understood, as appears below, that it is applicable to other carbonated beverages.

In the past, it has been well known that beer and other carbonated beverages have been subject to the disadvantage of gushing at certain times when opened. The gushing phenomenon constitutes a frothing over the opening of the bottle or canned container when opened, and a spilling over of the beverage until the gushing subsides. Beers are normally carbonated in the ranges of 0.25 to 0.60% by weight. The $CO_2$ is in a more or less supersaturated state in the beverage in the sealed container, so that when the container is opened and pressure is thereby reduced, rapid evolution of $CO_2$ from the beverage may result in gushing.

The gushing phenomenon has been attributed to a number of different causes and various theories have been prescribed in an attempt to explain it. One of the contributing factors has been attributed to the formation of nuclei with the sorption of $CO_2$ on the surface. It has also been thought that the phenomenon is caused by the formation of calcium oxalate, which has been considered to form nuclei of critical size which is involved in the sudden release of $CO_2$ from beer to cause gushing. Independent of the theory of the cause of the gushing, it is well known that solid impurities, vibration, time, increase in temperature and temperature variations all enhance the possibility of gushing. In the present day situation where beer is conventionally cooled in a cold box, there is usually associated with this cooling a substantial amount of vibration so that this condition accelerates the possibility of gushing. Also, impurities such as just a few p. p. m. of metallic ions of the heavy metals can promote gushing.

By means of this invention it has been found that the enzyme, carbonic anhydrase, can be used to reduce very greatly the gushing phenomenon under normal conditions and during the normal life of fermented malt beverages such as beer. The enzyme is used to inhibit the release of $CO_2$ and thereby prevent gushing. When used with an activator, which is preferably employed to protect the enzyme and to neutralize the effect of some enzyme inhibitors present in the beer, it has been found that beers which have been subject to gushing have been cured of this trouble. Actually, it is believed that the enzyme, carbonic anhydrase, is present in some of the components utilized in the brewing of beer since it is a known constituent in some of these ingredients. However, due to normal processing treatments involving elevated temperatures and the introduction of some inhibitors as well as a deficiency in the very small amounts introduced in the formulation of the beer, its activity is not great enough to inhibit gushing. Thus, by means of this invention there is provided a buildup and activation of the carbonic anhydrase to the required amount to serve the useful purpose intended.

It has been found by means of this invention that the carbonic anhydrase can be added in very minute amounts to beer with activators to protect and prolong its activity so that the cost is low while the treatment is effective and relatively long-lasting. There are no deleterious effects due to taste or other disadvantageous physical conditions, since the carbonic anhydrase is a normal constituent of finished beers and has therefore very desirable attributes in this food product which is used for human consumption.

Accordingly, it is a primary object of this invention to provide a stable carbonated beverage and a method for preparing the same in which said beverage is not subject to gushing.

It is a further object of this invention to provide a carbonated beverage and process for preparing the same, in which carbonic anhydrase is employed to make the beverage stable without the likelihood of gushing.

Still another object of this invention is to provide a stable non-gushing beer and method for preparing the same in which an agent is employed that inhibits the evolution of $CO_2$ so as to prevent gushing under normal treatment.

Still another object of this invention is to provide a stable beer that is not subject to gushing, together with a process for preparing the same in which carbonic anhydrase is employed.

Yet another object of this invention is to provide a beer and method for preparing the same in which carbonic anhydrase and an activator are added to the beer, in such amounts as to prevent gushing without affecting any of the other properties of the beer, such as stability, color, taste and brilliance.

Still another object of this invention is to provide a non-gushing beer and process for preparing the same in which an activator for carbonic anhydrase is added to the beer.

Yet another object of this invention is to provide a process for the prevention of gushing in beer by the addition of carbonic anhydrase and an activator, in which the addition agents are inexpensive in cost, non-toxic and completely compatible in the beer.

Further objects of this invention will appear in the detailed description which follows and will be further apparent to those skilled in the art.

The enzyme, carbonic anhydrase, employed in this invention is a complex substance and its exact chemical formula is unknown. However, it has been determined to have a molecular weight of approximately 30,000, and it is known to be a homogeneous protein. It is of the thiol type with two active centers, SH and CO. It has been reported to have an amino-acid analysis of nitrogen of 15.9%, cysteine 1.3% and tyrosine of 4.1%.

The enzyme is found in the chloroplast or cytoplasm of most green plants, including barley, corn and probably hops. It is also found in the roots of some species and in the leaves of all cultivated Brassicas. In many cases the activity is dependent upon the age of the plant, occurring more in the mature leaves but decreasing again in old age. Green leaves kept in darkness for four to five days are reduced in activity by 30 to 50%. It is also found in traces in most tissues of all vertebrates and in the tissues of some invertebrates. The enzyme is present in very high concentrations in erythrocytes. When prepared from animal tissue the enzyme has a zinc content of 0.2 to 0.33%, which corresponds to about one atom of zinc per molecule.

The enzyme, carbonic anhydrase, is used in this invention to catalyze the reversible reaction:

$$CO_2 + H_2O \underset{(2)}{\overset{(1)}{\rightleftarrows}} H_2CO_3$$

Assuming that the enzyme stabilizes the above reaction maintaining a reversible equilibrium, any inactivation of the enzyme would cause a spontaneous release of $CO_2$, since reaction (1) has an activation energy of 19 kcal. and reaction (2) is spontaneous without the catalyst.

If, at a constant concentration of the enzyme the pressure of the system were increased, as occurs during pasteurization, the equilibrium is shifted in the direction of lesser volume, i. e., to the right. This will increase the concentration of $H_2CO_3$ without the addition of the enzyme beyond the capacity of the system, with the consequence that when the pressure is released the equilibrium will shift to the left. Assuming that the return of this equilibrium to normal takes place over several days, which is actually the case, freshly pasteurized beer will overflow when shaken and gradually reach equilibrium in three to five days.

As an example of the effect of the pressures built up during pasteurization upon bottled beer, reference is had to the table below. In Table 1, 12 fl. oz. bottled beers were tested daily for a seven day period after pasteurization. Each day during this test a group of bottles were opened at room temperature, and subjected to a shaking test which comprised fifteen seconds vigorous and uniform shaking followed by a rest period of thirty seconds immediately prior to opening. The result and extent of gushing are shown below:

*Table 1*

| 8/18 | 8/19 | 8/22 | 8/23 | 8/24 | 8/26 | 8/29 |
|------|------|------|------|------|------|------|
| 50 | 34 | 11 | 2 | 0 | 0 | Cap Over |
| 30 | 26 | 0 | 1 | 0 | 0 | 6 |
| 35 | 7 | 3 | 0 | 1 | Cap Over | Cap Over |
| 35 | 9 | 1 | 0 | 0 | Cap Over | Cap Over |
| 25 | 11 | 5 | 5 | 3 | Cap Over | Cap Over |
| 35 | 33 | 3 | 10 | 1 | Cap Over | Cap Over |
| 35 | 26 | 3 | 2 | 1 | Cap Over | Cap Over |
| 25 | 24 | 4 | 3 | 0 | Cap Over | Cap Over |
| 34 | 21 | 3.75 | 2.5 | .75 | ---------- | ---------- |

In the table above the words "Cap Over" indicate that the gushing occurred up to the top of the bottle and did not spill over in any measurable amount.

From the description above, it can be seen that during the first day after pasteurization, the gushing is highest. Accordingly, tests using carbonic anhydrase have been employed during this first day to compare the results against a control employing no carbonic anhydrase. These results are shown in Table 2, where the tests are taken by adding 1 to 5 drops of the enzyme solution indicated as (E), per bottle, in the first hour after pasteurization and at room temperature of 87° F.

*Table 2*

| 1 Drop 10 mg./l. (E) | 2 Drops 10 mg./l. (E) | 3 Drops 10 mg./l. (E) | 4 Drops 10 mg./l. (E) | 5 Drops 10 mg./l. (E) | Control |
|------|------|------|------|------|------|
| 15 | 12 | 4 | 26 | 30 | 20 |
| 20 | 4 | 15 | 20 | 20 | 25 |
| 5 | 15 | 25 | 15 | 35 | 25 |
| Cap | Cap | 18 | 25 | 31 | 40 |
| 10 | 7.7 | 16 | 21 | 26.5 | 27.5 |

From the results in Table 2, it can be seen that the use of small quantities of carbonic anhydrase greatly reduced the amount of gushing. From the results of this test, the optimum amount was 2 drops per bottle of a solution containing 10 mg. per liter of carbonic anhydrase enzyme. This corresponds to 34 mg. per 100 barrels, there being about 341 bottles per barrel. The best or optimum amount, per 100 barrels of the carbonic anhydrase in the beer can be as low as 8½ mg. to 17 mg., but the range can extend between 5 to as high as 100 mg. per 100 barrels with good results.

Because of the fact that the carbonic anhydrase tends to become inactivated due to the influences of high temperatures, vibration, the presence of air, time and also due to impurities, such as the heavy metal ions, there is preferably used with the carbonic anhydrase an activator or protective agent. Such activators may be present in small amounts in the brewing components, but an additional quantity is generally required. The activators can be peptones, cysteine, glutathione, histidine and histamine. The use of the peptones is preferred, as this is a commercially available substance that is not adversely affected by the brewing and pasteurization temperatures. These activators also counteract the effect of inhibitors which deactivate the carbonic anhydrase. Examples of inhibitors are mercaptide forming agents, mild oxidizing agents that act on the thiol group, carbonyl reagents, enediol compounds. Some substances within these classifications such as ascorbic acid and hydrogen sulfide may be present in the brewing process as original component additives or reaction products.

The carbonic anhydrase may be employed with or without the activator, and is preferably added in the beermaking process following fermentation and before pasteurization. However, because in the pasteurization process temperatures rise in the neighborhood of 140° F., there is some danger of inactivation of the carbonic anhydrase and an activator is preferably employed.

To show the advantages of carbonic anhydrase with peptone as an activator, an accelerated test simulating actual service conditions has been made. This test, which is generally used in the industry comprised observing six different brands of beer under the following conditions. The beers were subjected to 100° F. for a two week period after pasteurization. At the end of this period the beers were placed in a cold box at 32° F. for a period of two weeks. Sample bottles of each of the beers were then opened by hand and the amount of gushing was observed. The results are shown in Table 3. In this table the word "cap" indicates that the beer just gushed up to the top of the bottle, while the word "capped" indicates that it gushed just very slightly over the top, while the word "over" indicates that it gushed considerably over. Before the word "over" an asterisk quantitatively indicates the intensity of gushing over. Thus, a plurality of asterisks indicates a higher degree of gushing.

*Table 3*

| Beer "A" | Beer "B" | Beer "C" | Beer "D" | Beer "E" | Beer "F" |
|------|------|------|------|------|------|
| Over | **Over | Over | **Over | ***Over | Over |
| *Over | *Over | *Over | *Over | ***Over | *Over |
| *Over | *Over | *Over | *Over | *Over | Cap |
| *Over | + | *Over | + | Over | ---------- |
| *Over | Capped | *Over | Over | Over | Over |
| *Over | ***Over | Over | **Over | ***Over | Over |
| **Over | ***Over | *Over | **Over | ***Over | ---------- |
| ***Over | **Over | Capped | *Over | ***Over | *Over |
| *Over | *Over | *Over | *Over | ****Over | *Over |
| Capped | ***Over | *Over | Over | ***Over | *Over |

To demonstrate the efficacy of this treatment according to the invention, the same brands of beers which had been subjected to the same treatment as above, but which had not been opened, were again heated to 100° F. after the testing period had ended. After the heating to 100° F., the cap was removed and the beers were inoculated with three different quantities of a formulation of the enzyme, carbonic anhydrase, and peptone. This formulation consisted of 5 mg. of carbonic anhydrase and 500 mg. of peptone (0.05% by weight) per liter of water solution. The amount of this solution added to each bottle was varied between 1 to 3 drops as indicated by the numerals 1, 2 and 3 in Table 4 below. Also, to each bottle 0.177 g. of peptone was added, which corresponds to 0.05% by weight of the beer. After the heating stage the beers were placed in a cold box for five hours for cooling to 32° F. They were then opened with the results shown below.

*Table 4*

| Beer "A" | Beer "B" | Beer "C" | Beer "D" | Beer "E" | Beer "F" |
|---|---|---|---|---|---|
| 3 No Gush | 3 No Gush | 3 No Gush | 3 No Gush | Bottle Broken | 3 Capped |
| 2 No Gush | 2 No Gush | 2 No Gush | 2 No Gush | 2 No Gush | 2 No Gush |
| 1 No Gush | 1 No Gush | 1 Capped | 1 No Gush | 1 No Gush | 1 No Gush |

From the results of Table 4, it can be seen that gushing was, for all intents and purposes, completely stopped. Since this test corresponds to the actual expected treatment of the beer during its normal life, it will be evident that the invention has achieved its purpose.

To show the advantages of using another activating agent with the carbonic anhydrase enzyme, reference will be had to Table 5 listed below. In this table there are shown results of tests made similarly to, and at the same time as the tests whose results were shown in Table 2, in which beer is opened one hour after pasteurization at a temperature of 87° F. These tests employed varying amounts of the enzyme with 0.2 g. of histidine as the activating agent and were compared against the same untreated control beer used in Table 2. It can readily be seen by observing the results of Table 5 that there is a greater reduction in gushing when the activator is employed with the enzyme than when the enzyme is employed alone as in Table 2.

*Table 5*

| 2 Drops 10 mg./l (E) 0.2 g. histidine | 5 Drops 10 mg./l (E) 0.2 g. histidine | Control |
|---|---|---|
| Cap | Cap | 20 |
| 5 | 6 | 25 |
| Cap | Cap | 25 |
| --- | --- | 40 |
| 1.25 | 1.5 | 27.5 |

To show the advantages of this invention over untreated beer in the presence of impurities, tests have been made using activated carbon as a triggering impurity. To study the comparative effect of finely divided particles, a 10% suspension of activated carbon with water was prepared and 5 ml. portions were introduced into the test specimens. The tests comprised bottles of enzyme and activator treated beer compared against a control bottle. The results are seen here in Table 6 below, where the figures indicate ml. of overflow. Here it should be observed that in the tests of Table 6, all uses of the enzyme alone, or with the activating agent, or with the activating agent alone were better than the control. Thus, the activating agent alone, such as in the employment of only 0.05% peptone (by weight) per bottle, apparently acted to protect the carbonic anhydrase enzyme inherently in the beer preparation and gave very satisfactory results. The optimum use, however, appeared with the employment of the 0.05% peptone per bottle of beer with one drop of the enzyme solution of a 5 mg./l. The peptone solution was added in an amount to make up 0.177 g. of peptone per bottle, which corresponds to 0.05% per bottle of beer. In all cases the beer tested was taken right after pasteurization and then inoculated at room temperature with the activated carbon and the enzyme and for addition agent in admixture. The beers were then recapped, shaken and allowed to stand for 24 hours at room temperature. The bottles were then opened and given an eight second rest, before the measurement was commenced. It was noted in all cases that the rate of gushing was much greater for the control than it was for the treated beers.

*Table 6*

| Control | 1 Drop (E) | 1 Drop (E) plus .1 gr. histidine | 1 Drop (E) plus .1 gr. histidine plus .05% peptone solution | 1 Drop (E) plus .05% peptone solution | .05% peptone solution |
|---|---|---|---|---|---|
| 65 | 40 | 40 | 35 | 35 | 50 |
| 40 | 35 | 35 | 40 | 28 | 48 |
| 65 | 35 | 46 | 35 | 28 | 37 |
| 55 | 24 | 33 | 35 | 30 | 30 |
| 40 | 28 | 30 | 38 | 28 | 40 |
| 55 | 25 | 30 | 20 | 23 | 40 |
| 45 | 30 | 60 | 35 | 23 | 25 |
| 60 | 30 | 40 | 32 | 24 | 25 |
| 50 | 30 | 50 | 42 | 30 | 27 |
| 45 | 45 | 35 | 50 | 26 | 15 |
| 60 | 38 | 45 | 45 | 25 | 13 |
| 40 | 40 | 51 | 33 | 35 | 15 |
| 51+ | 33+ | 41+ | 36+ | 28− | 30+ |

Tests were also made using 15 p. p. m. of ferrous ion in a similar manner, as above, with the exception that ferrous ion was employed in place of activated carbon. Here it will be noted that the ion is not nearly as active as the activated carbon in promoting gushing, as seen by comparing the control in Table 7 below to the control of Table 6. The optimum results here occurred with the use of histidine and peptone as the activating agent together with the enzyme. The employment of the peptone solution with the enzyme also showed beneficial results and advantages over the control. Also the use of the peptone solution alone showed excellent results in all of the twelve bottles tested except one which might be explained by the addition of some unknown impurity or other factor. This same explanation is believed to apply to the case where histidine was employed as the majority of bottles tested were better in results than the control beer.

*Table 7*

| Control | 1 Drop (E) | 1 Drop (E) plus .1 gr. histidine | 1 Drop (E) plus .1 gr. histidine plus .05% peptone solution | 1 Drop (E) plus .05% peptone solution | .05% peptone solution |
|---|---|---|---|---|---|
| Cap | 5 | 0 | 0 | 0 | 0 |
| 3 | 3 | 20 | 0 | 0 | 0 |
| Cap | Cap | 0 | 0 | 0 | 0 |
| 1 | Cap | 0 | 0 | Cap | 0 |
| 0 | 0 | 15 | 0 | 0 | 0 |
| Cap | Cap | 0 | 0 | 0 | 0 |
| Cap | 0 | 25 | 0 | 0 | 0 |
| 0 | Cap | 0 | 0 | --- | 0 |
| 2 | Cap | 0 | 0 | 0 | Cap |
| 1 | 10 | 0 | 0 | 0 | 75 |
| 5 | Cap | 30 | 0 | 0 | 0 |
| 0 | Cap | 0 | 0 | 0 | 0 |
| 1 | 2 | 7.5 | 0 | 0 | 6 |

As mentioned above, a single activator for carbonic anhydrase may be employed in some cases with utility by itself, or in combination with other activating agents. Thus, it has been shown above in Tables 6 and 7 that the 0.05% peptone solution, per se, is of marked advantage when used alone to prevent gushing. Similarly, other activators such as cysteine, monohydrochloride, can be utilized although the results are not as good as when peptone is employed. To show the efficacy of this activator, a test was made on bottled beer at room temperature five hours after pasteurization. The beer which had been treated with this agent is compared against a control beer. The results are shown below in Table 8.

Table 8

| 0.1 g. cysteine monohydrochloride | 0.2 g. cysteine monohydrochloride | Control |
|---|---|---|
| 5 | Cap | 3 |
| Cap | Cap | Cap |
| Cap | Cap | Cap |
| Cap | Cap | Cap |
| 1 | Cap | 5 |
| Cap | Cap | 5 |
| 1 | 0 | 5 |
|  |  | 15 |
|  |  | 4 |
|  |  | 4 |
|  |  | 5 |
|  |  | 4 |
|  |  | 4.1 |

For best results, the activating agent which may be one or more of the activating agents previously described in combination, is used in quantities ranging upto about 100 g. per barrel. Usually, it is found that an amount of activating agent somewhere between 25 and 100 g. may be employed to best advantage. The activating agent, peptone, has quite advantageous features when used with the enzyme before pasteurization, since it is inexpensive and appears to protect the enzyme against inactivation, which can take place at the high temperatures of pasteurization. The peptones are cleavage products of more complex proteins, and are hydrolysis products which are soluble in water. They are of advantage in the beer-making process because they are not coagulated by heat, as are proteins, and can therefore protect the carbonic anhydrase enzyme in the pasteurization process.

In considering stock beers which are not treated according to this invention, it should be kept in mind that vibration is a detrimental influence. It is also detrimental to enzyme solution, should the vibration be very active, unless they are protected by an activating agent as mentioned above. This is due to the colloidal character of the enzyme which is surface active and is therefore, according to Gibb's law, concentrated in the surface layer. On vigorous shaking over a period of hours the enzyme without an activating agent may be inactivated by coagulation, thereby losing its power and causing wildness or gushing. Generally alterations in the colloidal state of the enzyme influence its activity and conditions which promote denaturation and coagulation of proteins will, in general, cause inactivation or destruction. The relation between enzyme concentration and enzyme action has been examined. The catalytic character of the enzyme might be explained by the hypothesis that a small quantity of the enzyme is capable of transferring infinite quantities of the substrate, but this is not the case. Certainly, a trace of an enzyme may convert large quantities of a substrate in a sufficiently long time, but in due course the enzyme is destroyed and the action gradually ceases.

As a result of this invention, beer treated with the enzyme, carbonic anhydrase, and the activating agent can substantially obviate gushing under normal treatment of the beer. The treatment is effective for a long period of time, up to the expected life of the beer which for stock beers does not ordinarily exceed six months. Further, the expense of treatment is very low because of the minute quantities required, and there are no deleterious effects due to taste or the like, as no adulterant is employed.

Although this invention has been particularly described with respect to the production of beer and the prevention of gushing therein, it should be understood that it is of broader scope than in the production of beer alone. Thus, the enzyme can be employed in other carbonated alcoholic beverages or soft drinks, in a like manner as described above. This will be apparent to those skilled in the art. Various other changes and modifications will likewise appear to those skilled in the art, and are within the scope of this invention as defined by the claims appended hereto.

What is claimed is:

1. A carbonated beverage characterized by its non-gushing properties, said beverage having added to it carbonic anhydrase to prevent evolution of $CO_2$ in such amounts as cause gushing.

2. A fermented malt beverage which is characterized by its non-gushing properties, said beverage including carbonic anhydrase added in the amounts of about 5 to 100 mg. per 100 barrels.

3. A fermented malt beverage which is characterized by its non-gushing properties, said beverage including carbonic anhydrase to prevent evolution of $CO_2$ in amounts which cause gushing, and an activator for said carbonic anhydrase.

4. A fermented malt beverage which is characterized by its non-gushing properties, said beverage including carbonic anhydrase and an activator for said carbonic anhydrase, said activator including at least one member of the group consisting of peptone, cysteine, glutathione, histidine and histamine.

5. A fermented malt beverage which is characterized by its non-gushing properties, said beverage including carbonic anhydrase and an activator for said carbonic anhydrase, said activator including at least one member of the group consisting of peptone, cysteine, glutathione, histidine and histamine, said activator being added in an amount up to about 100 g. per barrel.

6. A fermented malt beverage which is characterized by its non-gushing properties, said beverage including carbonic anhydrase and a peptone.

7. A fermented malt beverage which is characterized by its non-gushing properties, said beverage including carbonic anhydrase and histidine.

8. A fermented malt beverage which is characterized by its non-gushing properties, said beverage including carbonic anhydrase and crysteine.

9. A fermented malt beverage which is characterized by its non-gushing properties, said beverage including carbonic anhydrase and histamine.

10. A fermented malt beverage which is characterized by its non-gushing properties, said beverage including carbonic anhydrase and glutathione.

11. A process for the prevention of gushing in fermented malt beverages which comprises adding carbonic anhydrase to the beverage subsequent to its fermentation.

12. A process for the prevention of gushing in fermented malt beverages which comprises adding carbonic anhydrase to the beverage subsequent to its fermentation, said carbonic anhydrase being added in the amount of about 5 to 100 mg. per 100 barrels.

13. A process for the prevention of gushing in fermented malt beverages which comprises adding carbonic anhydrase and an activating agent therefor to the beverage subsequent to its fermentation, said activating agent including at least one member of the group consisting of peptone, cysteine, glutathione, histidine and histamine.

14. A process for the prevention of gushing in fermented malt beverages which comprises adding peptone and carbonic anhydrase to the beverage.

15. A process for the prevention of gushing in fermented malt beverages which comprises adding histidine and carbonic anhydrase to the beverage.

16. A process for the prevention of gushing in fermented malt beverages which comprises adding cysteine and carbonic anhydrase to the beverage.

17. A process for the prevention of gushing in fermented malt beverages which comprises adding histamine and carbonic anhydrase to the beverage.

18. A process for the prevention of gushing in fermented malt beverages which comprises adding glutathione and carbonic anhydrase to the beverage.

19. A fermented malt beverage which is characterized by its non-gushing properties, said beverage including carbonic anhydrase to prevent evolution of $CO_2$ in amounts which cause gushing.

References Cited in the file of this patent

UNITED STATES PATENTS

| | | |
|---|---|---|
| 2,128,432 | Ramage | Aug. 30, 1938 |
| 2,262,230 | Gillman | Nov. 11, 1941 |

OTHER REFERENCES

Text: The Enzymes, by J. B. Sumner and K. Myrback, vol. 1, Part 2, published by Academic Press Inc., Publishers, New York, 1951, pages 1250–1265.